Aug. 30, 1932.                G. H. HAMBLEY                1,875,237
                         POWER TRANSMISSION DEVICE
                       Original Filed Sept. 16, 1929
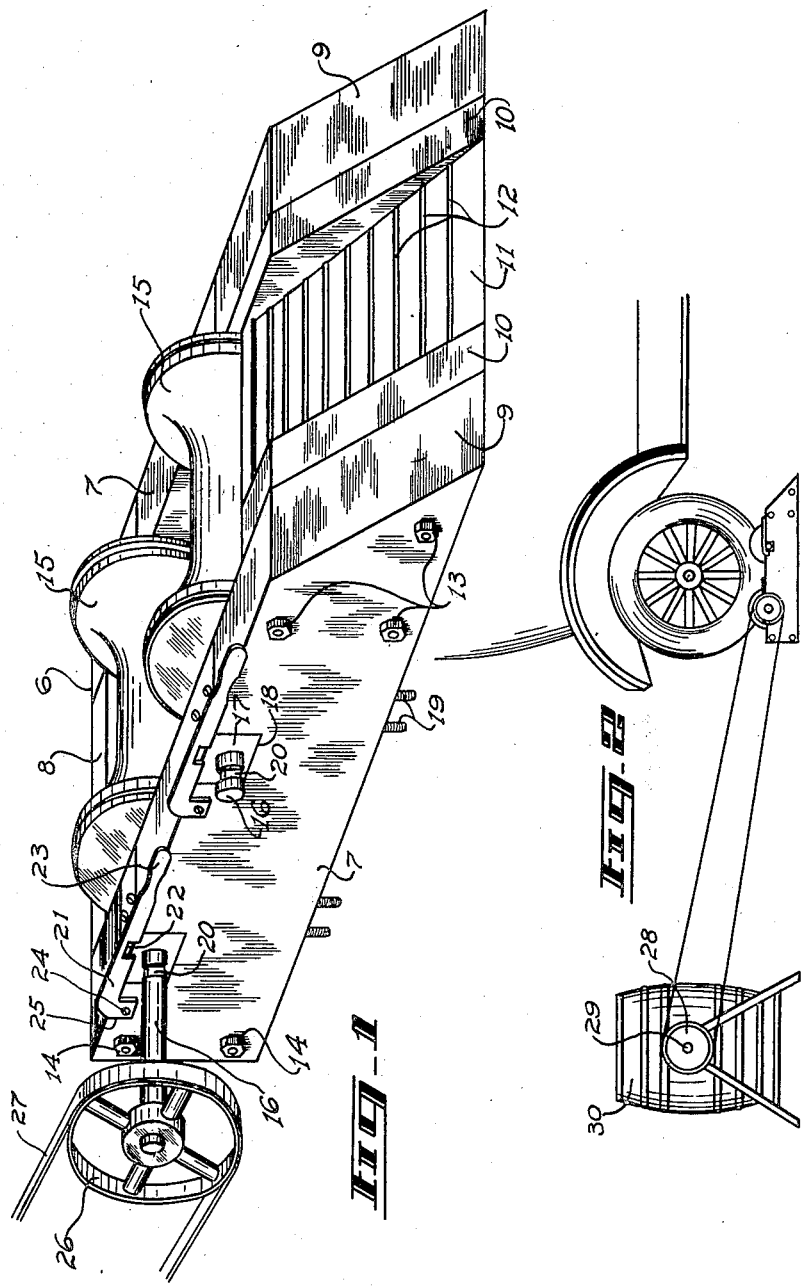
INVENTOR
George Henry Hambley
his Attorney Patented Aug. 30, 1932

1,875,237

UNITED STATES PATENT OFFICE

GEORGE HENRY HAMBLEY, OF HIGH BLUFF, MANITOBA, CANADA

POWER TRANSMISSION DEVICE

Application filed September 16, 1929, Serial No. 393,020, and in Canada September 20, 1928. Renewed May 5, 1931.

This present invention relates to new and useful improvements in a power transmission device and has for its primary object the provision of a simple structure which may be employed under one or both of the driving wheels of a motor vehicle or the like to transfer power therefrom to a churn, a saw or other device to be operated.

Another object of the invention resides in the provision of a power transmission device of the character stated in which the shafts carrying the grooved rollers may be separately held against rotation, as desired.

A further object of the invention resides in the provision of a power transmission device of the character stated which is constructed in such a manner that the motor vehicle wheel or wheels may be readily run onto or off of the same and which will be held against movement on the surface beneath the wheel or wheels, during operation of the device.

A still further object of the invention resides in the provision of a power transmission device which is composed of the minimum number of parts of simple and inexpensive construction and operation, as well as highly efficient in use and which may be manufactured and distributed at small cost.

To the accomplishment of these and related objects as shall become apparent as the description proceeds, my invention resides in the construction, combination and arrangement of parts as shall be hereinafter more fully described, illustrated in the accompanying drawing, and pointed out in the claims hereunto appended.

The invention will be best understood and can be more clearly described when reference is had to the drawing forming a part of this disclosure, wherein like characters indicate like parts throughout the several views.

In the drawing:—

Figure 1 is a perspective view of the improved device; and

Figure 2 is a side elevation, showing the manner of employing the device for transferring power from the motor vehicle wheel or wheels to a device to be operated thereby.

Referring more in detail to the drawing, it will be noted that the device includes a rectangular frame 6 having side members 7 connected at one end by the rear frame member 8 while their forward ends 9 are bevelled or inclined and have blocks 10 on their inner sides which are also inclined and serve to support therebetween the runway 11 having transverse steps 12 on its upper face and appropriately spaced in parallel relation. The blocks 10 are secured in position by the transverse bolts 13 extended therethrough and through the frame side members 7. Bolts 14 or the like are also extended transversely through the rear portions of the frame side members 7 and through the rear end frame member 8.

Mounted transversely in the frame 6 and in spaced parallel relation is a pair of grooved rollers 15 which are rigidly mounted on the transverse shafts 16, which latter rotate in the bearings 17 secured in the pockets 18 provided therefor in the upper face of the frame side members 7. Pairs of threaded bolts 19 or the like are employed for securing each bearing 17 in position and are extended downwardly therethrough and through the side frame members 7 so that the extended lower ends of the threaded bolts 19 will readily bite into the surface and thus retain the device against movement during operation thereof. Each shaft 16 has one end extended and provided with a reduced squared portion 20 for engagement by the locking lever 21 to lock the shaft 16 against rotation. Each lever 21 has a notch 22 provided therein to permit engagement of the lever 21 over the reduced squared portion 20 of the shaft 16. The lever also has a free handle portion 23 by which it may be moved readily on its pivot 24 to operative or inoperative position, as desired. The lever 21 has its pivot 24 extended through the right angled end 25 of the lever and into the side member 7 of the frame 6, adjacent the shaft 16 for which the lever 21 is provided. Carried on the projecting end of one of the shafts 16 is a belt wheel 26 or the like having the driving belt 27 working thereover and also operating on a second or driven belt wheel 28 on a shaft 29 of the device 30 to be operated by the power transferred through the medium of this device from the motor vehicle wheel or wheels. It is apparent that the device 30 may be a churn, saw, a grinding wheel or any other operative device which can be driven by the amount of power to be derived from a motor vehicle driving wheel or wheels.

As the construction of the device has thus been described in detail, brief reference is now had to its use and modus operandi: The wheel or wheels of the motor vehicle for driving the device may be readily run up the runway 11 and onto the pair of rollers 15 while the latter with their shafts 16 are locked against rotation by the locking levers 21 and the complete device is held against movement on the surface by the depending ends of the threaded bolts 19. When it is desired to permit rotation of the shafts 16, the lever 21 for the shaft or shafts to be rotated is moved to inoperative position and thus disengaged from the shaft 16 or shafts, thus permitting free rotation thereof corresponding to the rotation of the vehicle wheel or wheels. As the shaft 16 carrying the belt wheel 26 rotates, the belt 27 will thus be operated to transfer the power from the motor vehicle wheel or wheels to the device 30 to be operated thereby. When it is desired to discontinue use of the device, the shafts 16 may again be locked against rotation by their respective levers 21 and the rollers 15 thus held stationary while the motor vehicle wheel or wheels pass off of the rollers 15 and down the runway 11.

From the foregoing description taken in connection with the accompanying drawing, it will be manifest that a power transmission device is provided that will fulfill all the necessary requirements of such a device, but as many changes could be made in the above description and many apparently widely different embodiments of my invention may be constructed within the scope of the appended claims without departing from the spirit or scope thereof, it is intended that all matters contained in the said accompanying specification and drawing, shall be interpreted as illustrative and not in a limited sense.

Having thus described my invention, what I claim as new and desire to secure by Letters Patent is:—

1. A power transmission device including a rectangular frame, having a pair of spaced side members bevelled at their forward ends; a rear frame member connecting said side members at the remote end; inclined blocks inside each of said side members at their forward inclined ends and a stepped runway between said blocks; bearings countersunk in the side members of said frame; shafts operable in said bearings; securing members for said bearings depending through said side members and adapted to bite into the surface on which said frame rests to prevent the shifting of same; grooved rollers rigid on said shaft within said frame; means to individually lock said shafts against rotation; and a power transmission pulley on one of said shafts, exterior of said frame.

2. A power transmission device including a rectangular frame having a pair of spaced side members bevelled at their forward ends; a rear frame member between said side members at the remote end; inclined blocks inside each of said side members at their forward inclined ends and a stepped runway between said blocks; transverse bolts through said side members and said rear frame member and through said side members, inclined blocks and said intermediate stepped runway; pockets in the upper edges of said side members in registering pairs; bearings secured in said pockets; securing members for said bearings depending through said side members and adapted to bite into the surface on which said frame rests; shafts extended through said bearings; rollers carried on said shafts within said frame; power transmitting means on an extended end of one of said shafts and means carried on said frame for cooperation with said shafts to lock the latter individually against rotation at times.

In testimony whereof I hereunto affix my signature.

GEORGE HENRY HAMBLEY. [L. S.]